United States Patent
Trieste, Jr.

(10) Patent No.: US 11,028,940 B2
(45) Date of Patent: Jun. 8, 2021

(54) UNDERGROUND VALVE MONITORING DEVICE AND METHOD OF OPERATION

(71) Applicant: Consolidated Edison Company of New York, Inc., New York, NY (US)

(72) Inventor: Richard J. Trieste, Jr., Staten Island, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 63 days.

(21) Appl. No.: 16/365,732

(22) Filed: Mar. 27, 2019

(65) Prior Publication Data
US 2019/0301639 A1  Oct. 3, 2019

Related U.S. Application Data

(60) Provisional application No. 62/651,468, filed on Apr. 2, 2018.

(51) Int. Cl.
*F16K 37/00* (2006.01)

(52) U.S. Cl.
CPC ................................ *F16K 37/0041* (2013.01)

(58) Field of Classification Search
CPC .............................. F16K 37/0041; G05D 7/06
USPC .......................................................... 137/554
See application file for complete search history.

(56) References Cited

U.S. PATENT DOCUMENTS

| | | | | |
|---|---|---|---|---|
| 1,004,436 | A * | 9/1911 | Kehr | E03B 9/10 137/366 |
| 3,355,728 | A | 11/1967 | Smith | |
| 3,797,286 | A * | 3/1974 | Saporito | F16K 35/10 70/169 |
| 4,036,249 | A * | 7/1977 | Perry, Sr. | E03F 1/002 137/367 |
| 5,555,998 | A * | 9/1996 | Coppola | E03B 9/10 137/371 |
| 6,926,024 | B2 * | 8/2005 | McEnerney | E03B 9/10 137/15.08 |
| 8,082,945 | B1 | 12/2011 | White et al. | |
| 9,879,812 | B2 | 1/2018 | Roell | |
| 2006/0260688 | A1 * | 11/2006 | Green | E03B 9/10 137/371 |
| 2009/0145917 | A1 | 6/2009 | Wojcik | |
| 2017/0039517 | A1 * | 2/2017 | Amann | H04W 4/023 |
| 2017/0232285 | A1 * | 8/2017 | Magee | A62C 35/68 137/554 |

* cited by examiner

*Primary Examiner* — Angelisa L. Hicks
(74) *Attorney, Agent, or Firm* — Cantor Colburn LLP

(57) ABSTRACT

A system and method for monitoring an underground valve is provided. The system includes a valve having an actuator operable to open and close the valve. The system includes a first housing having a recess, the recess being sized to fit at least partially over the actuator. A second housing is removably coupled to the first housing, the second housing having a hollow interior disposed to have an open end enclosed by the first housing, the second housing further having a handle feature opposite the open end. A sensor is disposed in the hollow interior, the sensor generating a first signal in operation in response to a movement of the second housing.

25 Claims, 5 Drawing Sheets

UNDERGROUND VALVE MONITORING DEVICE AND METHOD OF OPERATION

CROSS REFERENCE TO RELATED APPLICATIONS

This application claims the benefit of U.S. Provisional Application Ser. No. 62/651,468, filed Apr. 2, 2018, the entire disclosure of which is incorporated herein by reference.

BACKGROUND

The subject matter disclosed herein relates to underground valves for liquid or gas pipes, and in particular to a device and method for monitoring a valve connected to a pipe.

Pipes are used in a variety of applications to either transfer a material, such as a gas or liquid for example, from a first area to a second area. Often, these pipes are located underground. To control the flow of the gas, such as natural gas for example, valves are installed at a variety of locations. This allows the utility personnel to selectively shut off sections of pipe to allow maintenance operations.

Since the pipes are located underground, the valves are also located underground. Typically, utility personnel access the underground valve through a valve box located on the surface above the valve. The valve box includes a riser shaft that extends down to the top of the valve. Using a valve key, the valve may be actuated between an open and closed position. Typically the valve includes a square nut that the valve key fits over in order to rotate and actuate the valve.

Typically, valve boxes do not include a lock and are left in an unsecured state. This allows utility personnel to quickly access the valve. However, the unsecured state of the valve box may also allow unauthorized third-parties to close the valve and shut off or reduce the gas pressure to downstream customers.

While existing valve box and underground valves are suitable for their intended purposes, a need for improvement remains in providing a device and method for monitoring when someone accesses these underground valves.

BRIEF DESCRIPTION

According to one aspect of the invention, a system for monitoring an underground valve is provided. The valve includes an actuator operable to open and close the valve. The system includes a first housing having a recess, the recess being sized to fit at least partially over the actuator. A second housing is removably coupled to the first housing, the second housing having a hollow interior disposed to have an open end enclosed by the first housing, the second housing further having a handle feature opposite the open end. A sensor is disposed in the hollow interior, the sensor generating a first signal in operation in response to a movement of the second housing.

According to another aspect of the invention, a method of monitoring an underground valve is provided. The method includes disposing a housing onto an actuator of an underground valve, the housing having a first portion coupled to a second portion, the first portion having a recess sized to at least partially receive the actuator, the second portion having a hollow interior with an open end, the open end being enclosed when the second portion is coupled to the first portion. Motion of the housing is detected with a sensor disposed in the hollow interior. A first signal is transmitted in response to the determining of motion.

According to yet another aspect of the invention, an underground gas delivery system is provided. The system includes a valve box having an unsecured removable cover. A riser shaft is coupled to the valve box and extending into the ground. A gas pipe is disposed underground. A valve is operably coupled to the gas pipe, the valve having an actuator and being arranged with the actuator being within the riser shaft. A monitoring device having a first housing, a second housing and a sensor. The first housing having a recess sized to fit at least partially over the actuator. The second housing is removably coupled to the first housing, the second housing having a hollow interior disposed to have an open end enclosed by the first housing, the second housing further having a handle feature opposite the open end. The sensor is disposed in the hollow interior, the sensor generating a first signal in operation in response to a movement of the second housing.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present disclosure provide advantages in allowing the monitoring of an underground valve. Further embodiments of the present disclosure provide advantages in monitoring when an underground valve has been accessed. Further embodiments of the present disclosure provide advantages in recording a time and date when the underground valve was accessed.

Figure 1:
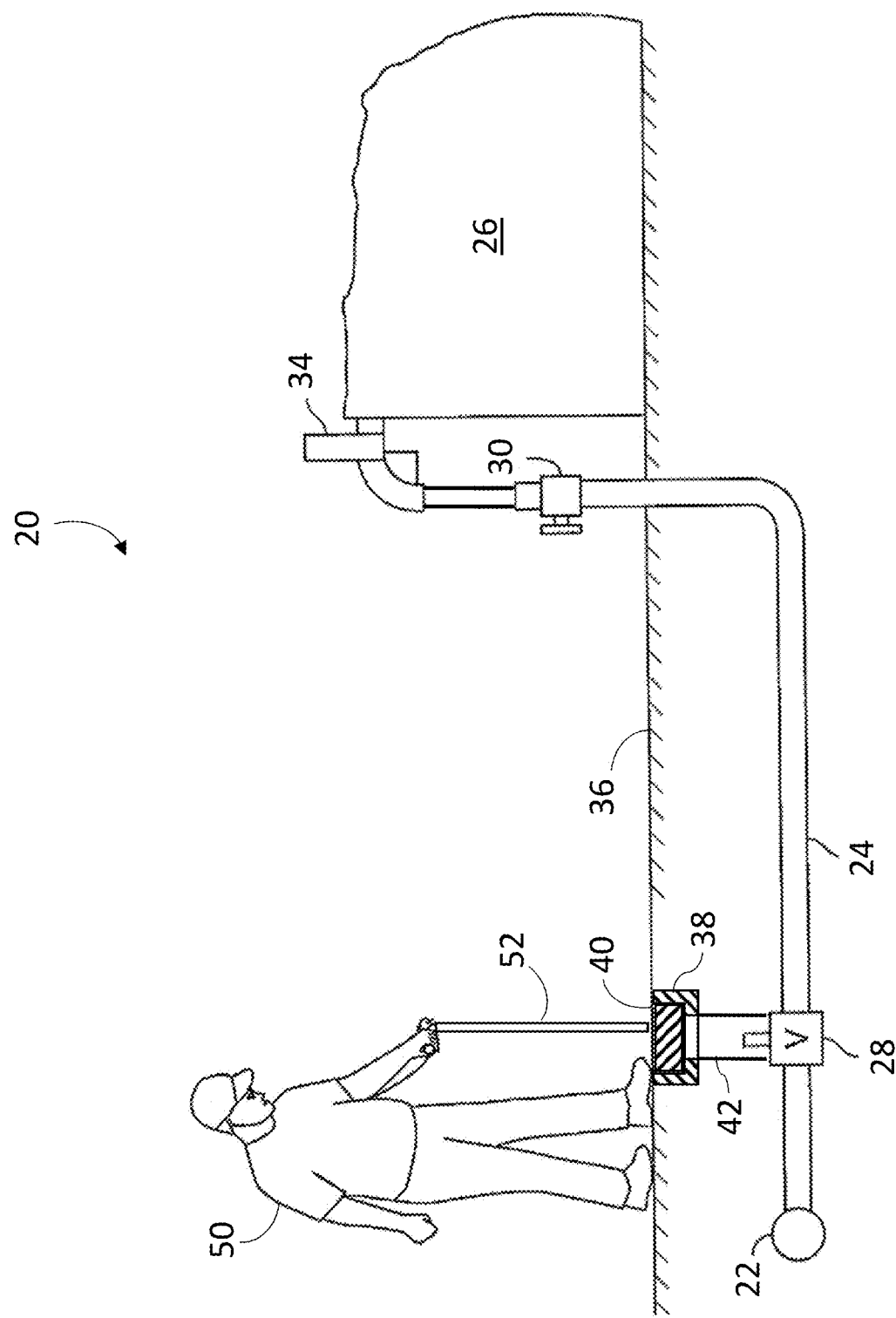
FIG. 1 is schematic view of a underground gas system having a valve monitoring device in accordance with an embodiment.

Referring to FIG. 1, an embodiment is shown of an underground gas delivery system 20. The gas system 20 includes a main gas pipe 22 which includes one or more branch conduits 24 that connect the main gas pipe 22 to a consumer 26, such as a residential house for example or another gas pipe same as pipe 22. The system 20 may include a number of valves 28, 30 that control the flow of gas, such as natural gas for example, to the consumer 26. The amount of gas used by the consumer 26 is measured by a meter 34. As discussed in more detail herein, the meter 74 may include a communication circuit that wirelessly connects the meter 74 to a communications network (e.g. a computer network). The communications network may be any suitable network for transmitting data, such as but not limited to an advanced metering network (AMI), a cellular network, a peer-to-peer network, a radio network, and a Wifi network for example.

Some of the valves, such as valve 28 may be disposed below ground level 36. It should be appreciated that while the illustrated embodiment shows the underground valve 28 as being to the branch pipe 24 (sometimes referred to as a curb valve), this is for exemplary purposes and the claims should not be so limited and underground valves may be located on the main gas pipe 22 and the valve 30 may also be located underground. To access these subterranean valves, an access structure is provided, such as the valve box 38 for example. The valve box 38 has a removable cover 40. The valve box 38 has an opening in the bottom that provides access to a riser shaft 42. The riser shaft 42 is generally a hollow cylindrical body (e.g. a pipe) that creates an airspace beneath the valve box 38. Generally, the underground valve, such as valve 28, is located directly below and at least partially within the riser shaft 42. It should be appreciated that typically the cover 40 is unsecured, meaning that there is no lock or other mechanism that prevents access to the riser shaft 42. This allows utility personnel rapid access to the valve. However, it could also allow unauthorized third parties to also access the valve.

Figure 2:
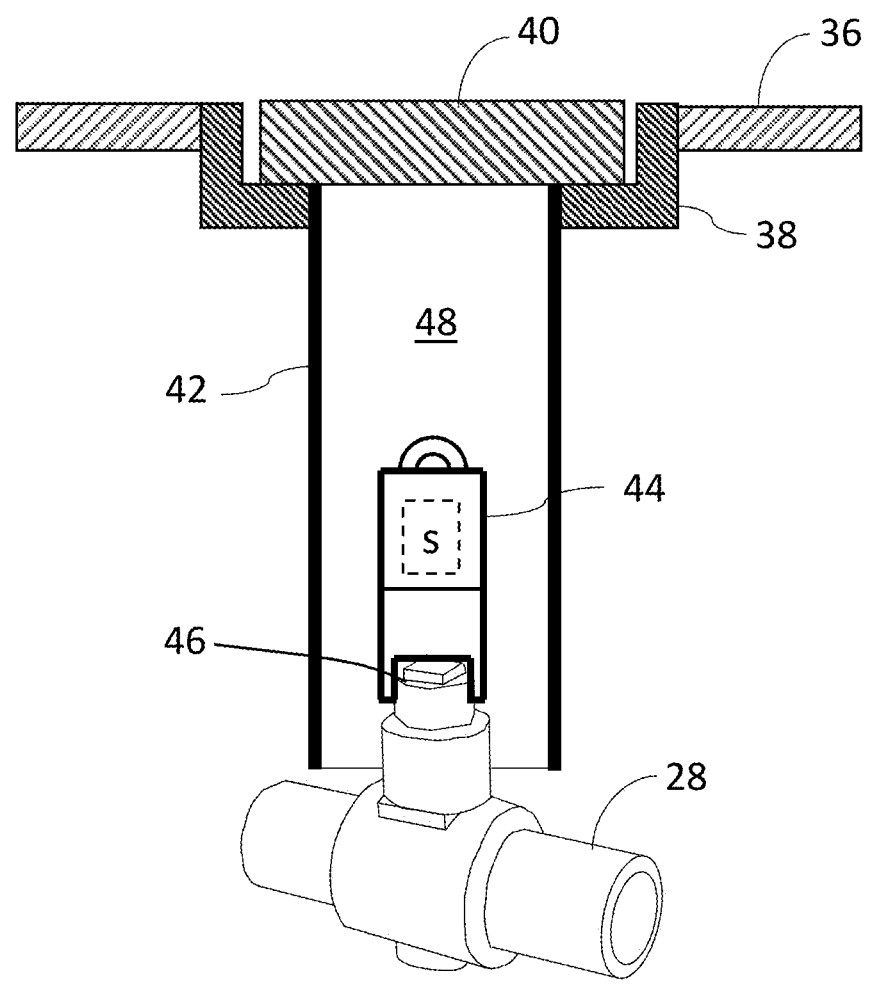
FIG. 2 is an enlarged schematic view of an underground valve having a monitoring device in accordance with an embodiment.
Figure 3:
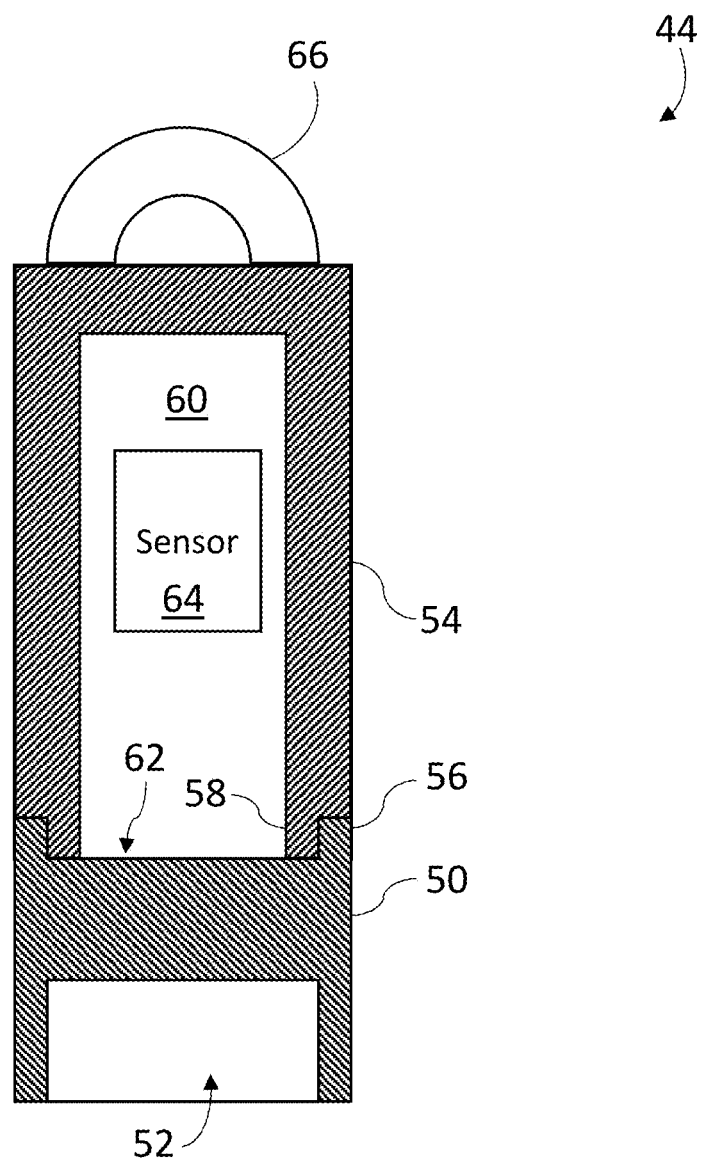
FIG. 3 is a sectional view of the valve monitoring device of FIG. 2 in accordance with an embodiment.

Referring now to FIG. 2 and FIG. 3, an embodiment of a monitoring device 44 is shown for monitoring the access status of the valve 28. As described herein, the monitoring device 44 detects when the valve 28 is accessed and generates an alarm signal. In this embodiment, the valve 28 has an actuator 46 disposed within the hollow interior 48 of the riser shaft 42. The actuator 46 is accessible from the surface 36 by service personnel 50 (FIG. 1) using a tool 52 when the cover 40 is removed. It should be appreciated that the tool 52 is keyed to engage the actuator 46 to open and close the valve 28.

In accordance with an embodiment, the monitoring device 44 is disposed on top of the actuator 46. The monitoring device 44 includes a first housing portion 50 having a recess 52. The recess 52 is sized and shaped to fit at least partially over the actuator 46. In this manner, when the monitoring device 44 is installed, before someone could open or close the valve, the monitoring device 44 would need to be removed. In one embodiment, the shape of the recess 52 has the same shape as the actuator 46 with another embodiment being the device 44 is sitting on top of actuator 46.

Coupled to an end of the first housing portion 50 is a second housing portion 54. In an embodiment, the first housing portion 50 is coupled to the second housing portion 54 by a fastener, such as threaded flanges 56, 58 or by a clamping mechanism. In an embodiment, the first housing portion 50 is sealing coupled to the second housing portion 54, such as with an o-ring or a gasket that is compressed when the threaded flanges 56, 58 are engaged. The second housing portion includes a hollow interior portion 60 having an open end 62. When the first housing portion 50 is coupled to the second housing portion 54, the open end 62 is enclosed by the first housing portion 50. The interior portion 60 is sized to receive a sensor 64. Sensor 64 may contain an internal antenna within 74 or and external antenna 75.

In an embodiment, the second housing portion 54 further includes a handle feature 66. The handle feature 66 is sized and shaped to allow the operator 50 to remove monitoring device 44 from the riser shaft 42. In an embodiment, the handle feature 66 may have a hook or a loop shape that allows a tool to engage the handle feature and lift the monitoring device. It should be appreciated that the lifting or movement of the monitoring device 44 will be detected by the sensor 64.

Figure 4:
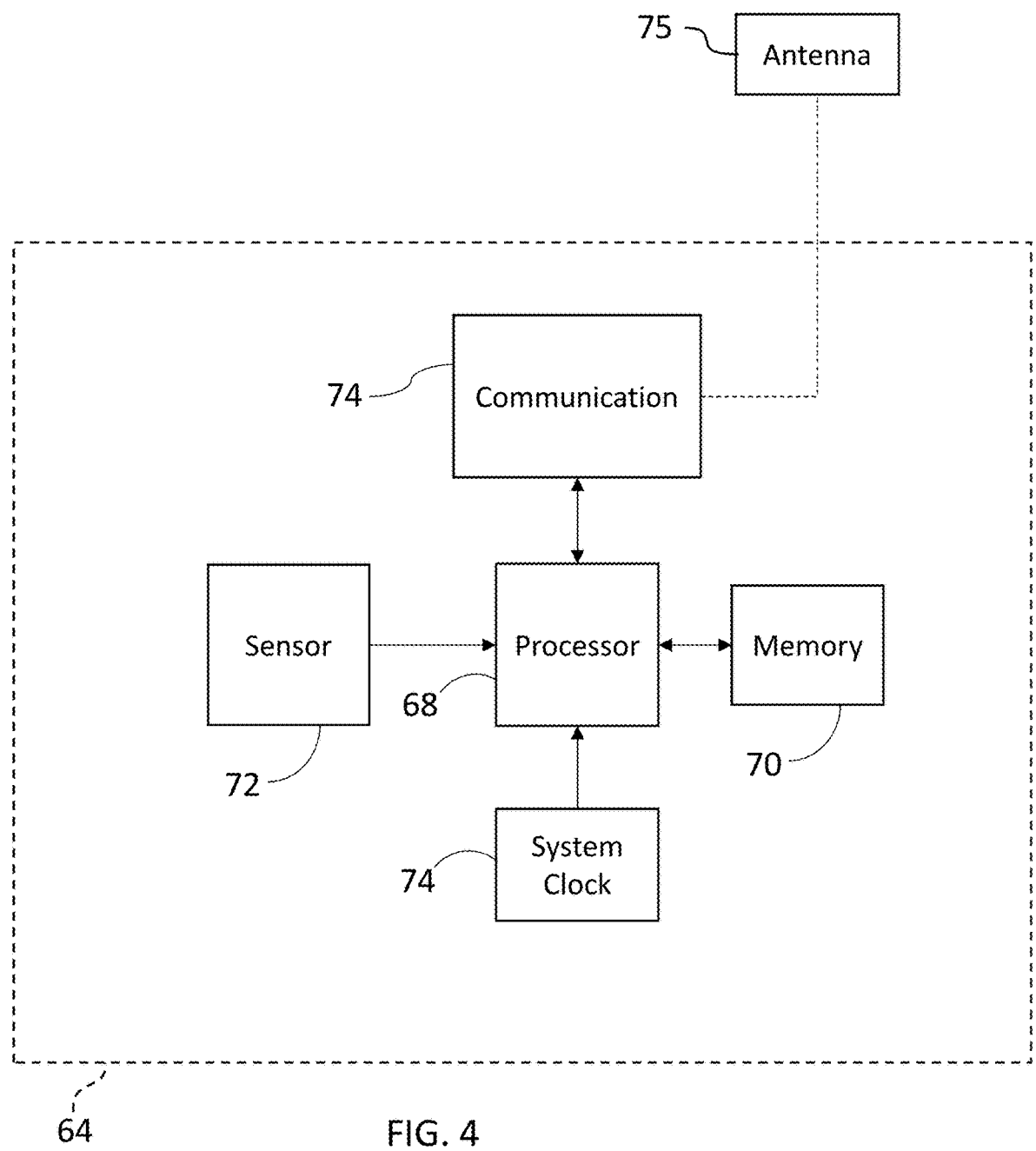
FIG. 4 is a schematic illustration of a sensor for use in the valve monitoring device of FIG. 3 in accordance with an embodiment.

Referring now to FIG. 4, an embodiment is shown of the sensor 64 with an optional antenna 75. The antenna 75 may be disposed internal to the sensor 64 or external to the sensor 64. In an embodiment, the antenna 75 may be external to the housing portions 50, 54. In this embodiment, the sensor includes a processor 68. The processor 68 is responsive to nontransitory computer instructions for performing control methods, such as those described herein. In an embodiment, the nontransitory computer instructions may be stored in memory 70. The memory 70 may include volatile and nonvolatile memory. The processor 68 receives inputs, such as from sensor 72 or system clock 74 for example, and provides an output signal, such as to communications circuit 76 or memory 70.

In an embodiment, the sensor 72 may be any suitable sensor that provides an output signal in response to detecting movement. The sensor 72 may be, but is not limited to, an accelerometer or a gyroscope for example. The sensor 72 detects movement (e.g acceleration) of the motion of the housing portions 50, 54 and generates a first signal that is transmitted to the processor 68. In response to receiving the first signal, the processor 68 transmits a second signal via a communications circuit 74.

Figure 5:
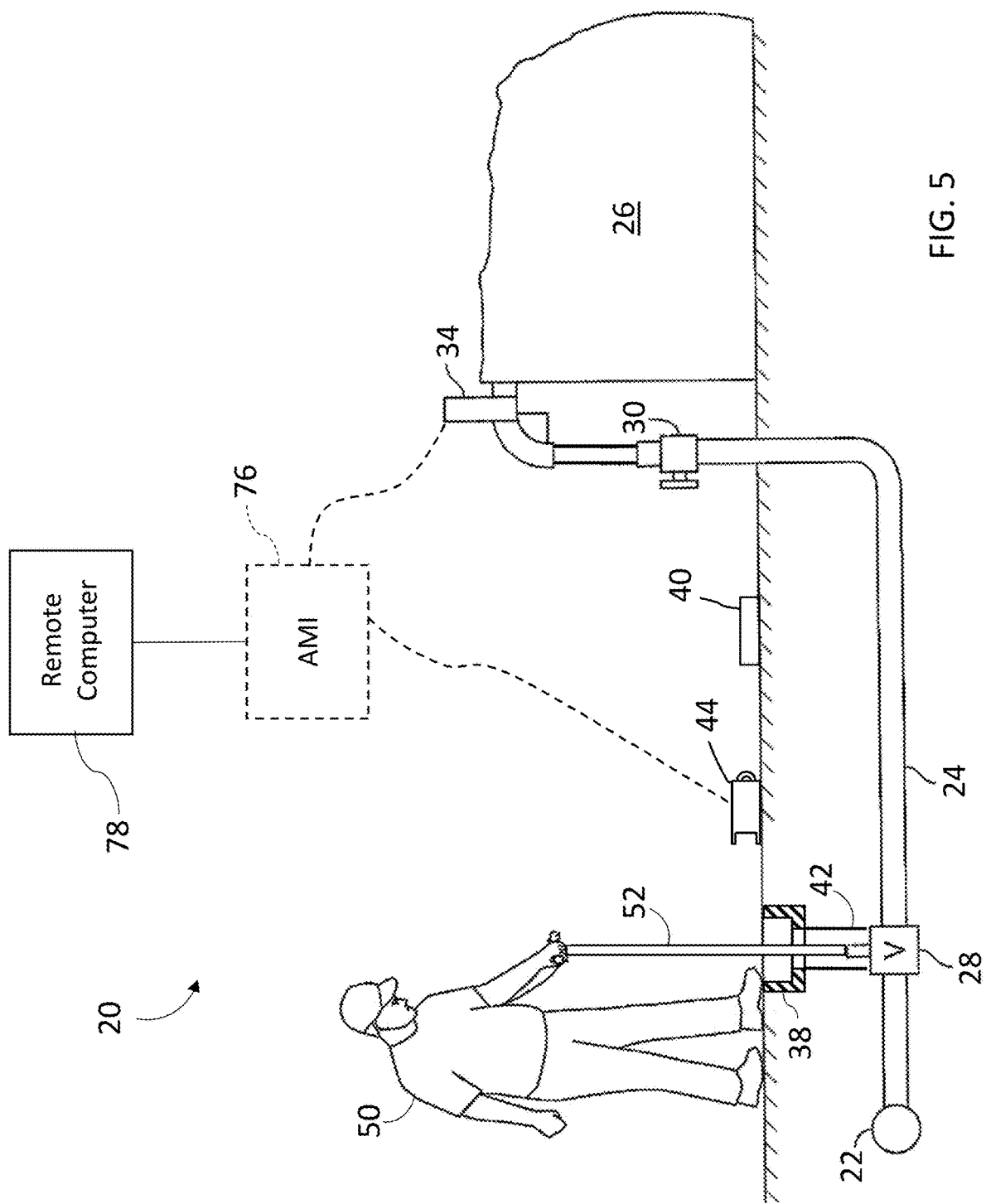
FIG. 5 is a schematic view of an underground gas system having a valve monitoring device that is removed to operate the valve in accordance with another embodiment.

In an embodiment, the communications circuit is operable to transit wired or wireless signals via a communications medium. The communications medium includes, but is not limited to: advanced metering infrastructure networks 76 (FIG. 5), cellular networks, radio networks, Wifi (IEE 802.11), a wide area network, a local area network, wireless ad hoc networks, mesh networks, low power long range wireless (LORA) networks, ZigBee (IEEE 802.15.4) networks, Ethernet and the Internet. In an embodiment, the monitoring device 44 communicates with one or more remote computers 78 via an AMI communications network. In an embodiment, the meters 34 also communicate via the same AMI communications network and can serve as a point to relay the signal from device 44.

In an embodiment, the processor further stores a date and time data in response to receiving the first signal from the sensor 72. The date and time data may be stored in memory 70 or transmitted to a remote computer via the communications circuit 74. It should be appreciated that the date and time data (sometimes referred to as timestamp data) will provide advantages in determining when utility personnel accessed the valve, which would be advantageous when investigating situations when the gas distribution system has poor pressure readings or customers make a no gas complaint. Both of these events could be associated with utility personnel performing valve inspections and the valve was left not in the full open position. Investigation of these type situations are arduous and require an immediate review of records to see when a valve was visited by utility personnel.

It should be appreciated that while embodiments herein describe the system and method in relation to gas valves, this is for example purposes and the claims should not be so limited. In other embodiments, the system and method may be used with other types of underground or subterranean valves, including but not limited to oil, gasoline, aircraft fuels, water or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for monitoring an underground valve, the valve having an actuator operable to open and close the valve, the actuator being disposed in a riser shaft that is enclosed by a cover the system comprising:
a first housing having a recess, the recess being sized to fit at least partially over and removably positioned directly above the actuator;
a second housing removably coupled to the first housing on an opposite side from the recess, the second housing having a hollow interior disposed to have an open end enclosed by the first housing, the second housing further having a handle feature opposite the open end, wherein the first housing and second housing are sized to fit within the riser shaft beneath the cover; and
a sensor disposed in the hollow interior, the sensor generating a first signal in operation in response to a movement of the second housing relative to the actuator when the first housing and second housing are removed from the riser shaft.

2. The system of claim 1, wherein the sensor includes an antenna.

3. The system of claim 2, wherein the antenna is disposed within the senor.

4. The system of claim 2, wherein the antenna is external to the sensor.

5. The system of claim 1, wherein the sensor includes an accelerometer, the accelerometer being operable to generate the first signal in response to movement of the second housing.

6. The system of claim 5, wherein the sensor further includes a processor and a communications circuit, the processor is responsive to nontransitory executable computer instructions to transmit a second signal via the communications circuit in response to the first signal.

7. The system of claim 6, wherein the processor is further responsive to storing a date and time data in a memory in response to the first signal.

8. The system of claim 7, wherein the data and time data is transmitted via the second signal.

9. The system of claim 1, further comprising a weather seal operably coupled between the first body and second body.

10. The system of claim 1, wherein the handle feature includes a hook member.

11. The system of claim 1, wherein the handle feature includes a loop member.

12. A method of monitoring an underground valve, the valve being disposed at least partially within a riser shaft that is enclosed by a cover, the method comprising:
removably disposing a housing onto an actuator of an underground valve, the housing having a first portion coupled to a second portion, the first portion having a recess sized to at least partially receive the actuator, the second portion being coupled to the first portion on an opposite side from the actuator, the second portion having a hollow interior with an open end, the open end being enclosed when the second portion is coupled to the first portion, the housing being sized to fit within the riser shaft beneath the cover;
detecting motion of the housing relative to the actuator when the housing is removed from the riser shaft with a sensor disposed in the hollow interior; and
transmitting a first signal in response to the determining of motion.

13. The method of claim 12, further comprising transmitting a second signal to a computer network in response to the first signal.

14. The method of claim 13, further comprising engaging a handle feature disposed on an end of the housing and removing the housing from the valve.

15. The method of claim 14, wherein the sensor is an accelerometer.

16. The method of claim 15, wherein the first portion is sealingly coupled to the second portion.

17. The method of claim 12, further comprising determining a date and time when the motion is detected.

18. The method of claim 17, further comprising storing the date and time data in memory.

19. The method of claim 12, wherein the sensor includes an antenna, the antenna being disposed within the sensor or external to the sensor.

20. An underground gas delivery system comprising:
a valve box having an unsecured removable cover;
a riser shaft coupled to the valve box and extending into the ground;
a gas pipe disposed underground;
a valve operably coupled to the gas pipe, the valve having an actuator and being arranged with the actuator being within the riser shaft;
a monitoring device disposed within the riser shaft beneath the removable cover, the monitoring device comprising:
a first housing having a recess, the recess being sized to fit at least partially over and being removably disposed above the actuator;
a second housing removably coupled to the first housing on an end opposite the actuator, the second housing having a hollow interior disposed to have an open end enclosed by the first housing, the second housing further having an handle feature opposite the open end; and
a sensor disposed in the hollow interior, the sensor generating a first signal in operation in response to a movement of the second housing relative to the actuator when the monitoring device is removed from the riser shaft.

21. The system of claim 20, wherein the sensor includes an accelerometer, the accelerometer being operable to generate the first signal in response to movement of the second housing.

22. The system of claim 21, wherein the sensor further includes a processor and a communications circuit, the processor is responsive to nontransitory executable computer instructions to transmit a second signal via the communications circuit in response to the first signal.

23. The system of claim 22, wherein the processor is further responsive to storing a date and time data in a memory in response to the first signal.

24. The system of claim 23, wherein the data and time data is transmitted via the second signal.

25. The method of claim 20, wherein the sensor includes an antenna, the antenna being disposed within the sensor or external to the first housing.

* * * * *